Patented Aug. 21, 1923.

1,465,841

UNITED STATES PATENT OFFICE.

RICHARD D. CHEESMAN, OF CHELSEA, MICHIGAN, AND ROBERT C. HAFF, OF HAGERSTOWN, MARYLAND, ASSIGNORS, BY MESNE ASSIGNMENTS, TO WESTERN PRECIPITATION COMPANY, OF LOS ANGELES, CALIFORNIA, A CORPORATION OF CALIFORNIA.

PROCESS OF OBTAINING WATER-SOLUBLE POTASSIUM COMPOUNDS.

No Drawing. Application filed November 10, 1916, Serial No. 130,664. Renewed February 9, 1918. Serial No. 216,405.

*To all whom it may concern:*

Be it known that we, RICHARD D. CHEESMAN and ROBERT C. HAFF, citizens of the United States, and residing, respectively, at Chelsea, county of Washtenaw and State of Michigan, and at Hagerstown, in the county of Washington and State of Maryland, have invented new and useful Improvements in Processes of Obtaining Water-Soluble Potassium Compounds, of which the following is a specification.

The present invention relates to a process of obtaining water soluble potassium compounds, and has particular reference to such a process for increasing the yield of the water soluble compounds, obtainable from dust, gases, or a mixture thereof, occurring during the production of Portland cement.

The invention is founded upon the discovery that the insolubility of the potassium compounds, or potash, which are present in the dust or gases, or mixture thereof, as above indicated, is caused by the combination of the volatile potassium compounds with ash. This ash results from the combustion of the powdered coal, employed in the process of producing Portland cement, as is well known. We have further discovered that by the employment of an alkaline compound, or a calcium compound, the normally insoluble potassium compounds may be rendered soluble. For accomplishing this, the alkaline compound or calcium compound is preferably added to the powdered coal, and intimately mixed therewith.

In the practice of our process in its preferred form, a suitable amount of an alkaline compound, or calcium compound, such as calcium oxid, or carbonate is intimately mixed with the powdered coal, in suitable proportions to combine with all or substantially all of the ash contents of the coal. We have found that satisfactory results are obtainable by adding ten parts by weight of the calcium compound to ninety by weight of the powdered coal.

The constituents of Portland cement, such as clay and lime-stone, are finely divided or ground and introduced into a rotary kiln. This mixture is then subjected to the action of heat and products of combustion which enter the kiln, from suitable burners employing the mixture of powdered coal and calcium compound, as fuel.

It is found that the silica iron and alumina of the ash, combine with the lime or calcium compound equivalent. This allows the volatile potassium compounds, to combine with other elements, such as sulfur, etc., to form soluble potassium compounds.

The dust, gases, or a mixture thereof, which pass from the kiln, and contain the water soluble potassium compounds, are suitably treated to recover such compounds.

The foregoing process is at the present time believed to be the best embodiment of our invention, but we do not wish to be limited to the precise steps as set forth, nor limit ourselves to the chemicals outlined above, and it is to be understood that the steps of the process may be modified in many different ways that may fairly fall within the scope of the appended claims.

Having thus described our invention, what we claim is:

1. The herein described process of producing water soluble potassium compounds; which consists in mixing an alkaline compound with coal; burning such mixture; subjecting the constituents of Portland cement to the direct action of the products of combustion from the mixture whereby water soluble potassium compounds are produced in the dust, and gases which are given off by the said constituents; and treating the dust and gases to recover the water soluble potassium compounds.

2. The herein described process of producing water soluble potassium compounds; which consists in mixing a calcium compound with powdered coal; burning such mixture; subjecting the constituents of Portland cement to the direct action of the products of combustion from the mixture whereby water soluble potassium compounds are produced in the dust, and gases which are given off by the said constituents; and collecting and treating the dust and gases to recover the water soluble potassium compounds.

3. The herein described process of producing water soluble potassium compounds, which consists in mixing substantially ten pounds by weight of a calcium compound with substantially ninety pounds by weight of powdered coal so that the calcium compound will combine with substantially all of the ash contents of the coal, burning the mixture, subjecting the constituents of Portland cement to the direct action of heat and products of combustion from the mixture, and collecting and separating out the water soluble potassium compounds.

4. The herein described process of producing water soluble potassium compounds, which consists in subjecting the constituents of Portland cement to the direct action of heat and products of combustion from powdered coal, while ensuring in the kiln atmosphere the presence of an added calcium compound to combine with the ash constituents of the coal prior to the combination of the ash constituents with the volatile potassium compounds whereby the volatile potassium compounds are free to combine with other elements for producing the water soluble potassium compounds, and recovering the water soluble potassium compounds.

In testimony whereof we affix our signatures this 2nd day of November 1916.

RICHARD D. CHEESMAN.
ROBERT C. HAFF.